United States Patent

[11] 3,596,049

| [72] | Inventor | Ralph Ogden |
| | | 1304 Fisher St., Munster, Ind. 46321 |
| [21] | Appl. No. | 838,419 |
| [22] | Filed | July 2, 1969 |
| [45] | Patented | July 27, 1971 |

[54] AIR-COOLED WELDING GUN
8 Claims, 21 Drawing Figs.

[52] U.S. Cl. ............................................. 219/136, 219/130
[51] Int. Cl. ............................................. B23k 9/00
[50] Field of Search .................................. 219/74, 130, 131, 137, 136

[56] References Cited
UNITED STATES PATENTS

| 2,572,084 | 10/1951 | Wilson | 219/130 |
| 2,866,887 | 12/1958 | Kumagai | 219/130 |
| 3,194,943 | 7/1965 | Flora | 219/130 |

*Primary Examiner*—J V Truhe
*Assistant Examiner*—C. L. Albritton
*Attorney*—Mann, Brown, McWilliams & Bradway ABSTRACT: The disclosure is directed to a welding gun for MIG welding in which the gas cup and contact tip of the nozzle are secured in place by a single-clamp-type device that permits ready replacement of both. The nozzle in turn is connected to the gun handle by a single-clamp device that permits ready replacement of the nozzle as a unit or ready change of positioning of same relative to the handle. The nozzle is arranged to provide for cooling of the gas tip through air fins on the nozzle that are in electrically insulating good heat transfer relation to the gas cup.

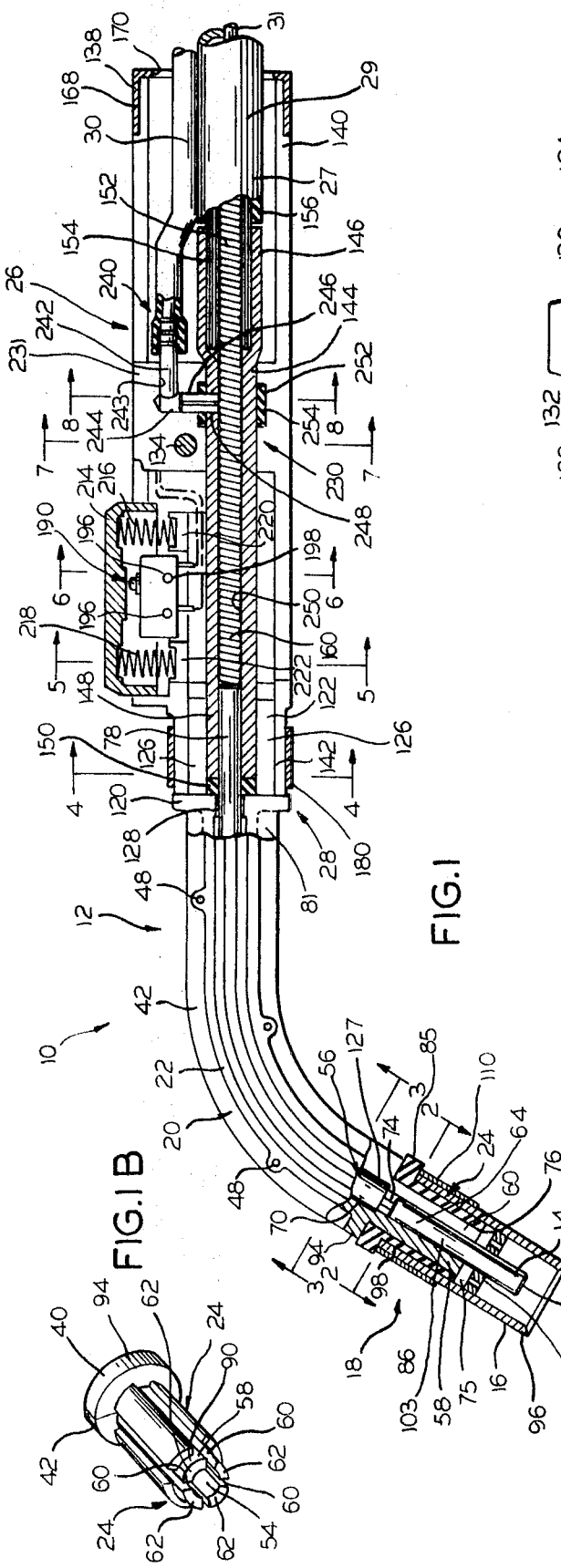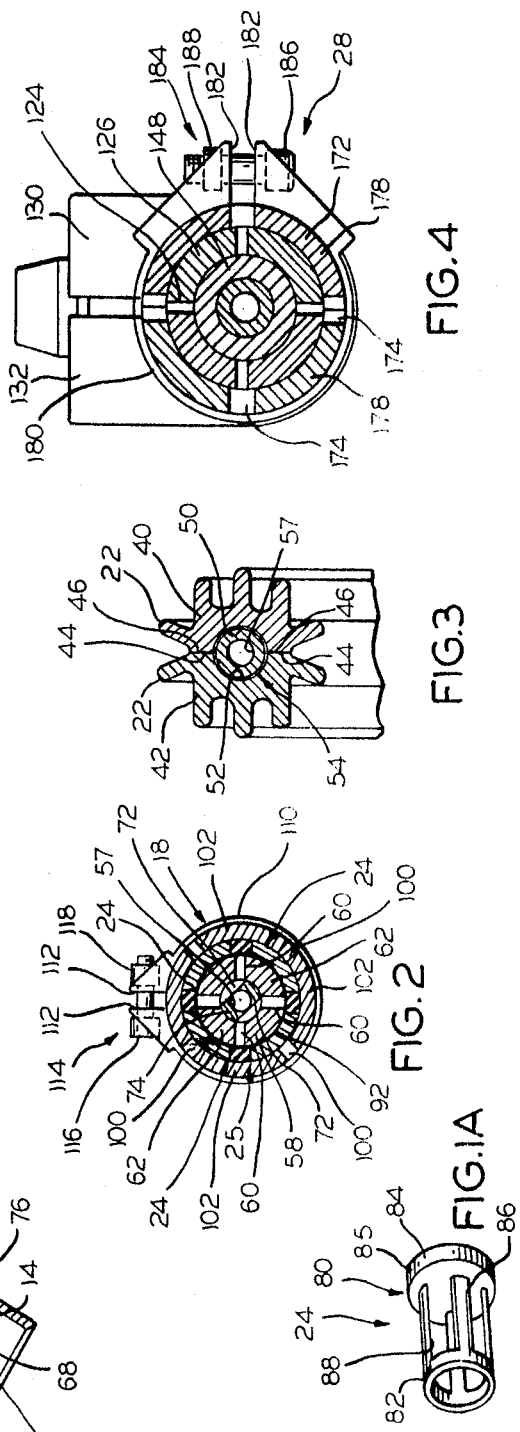
INVENTOR
RALPH OGDEN
BY
Mann, Brown & McWilliams
ATTORNEYS

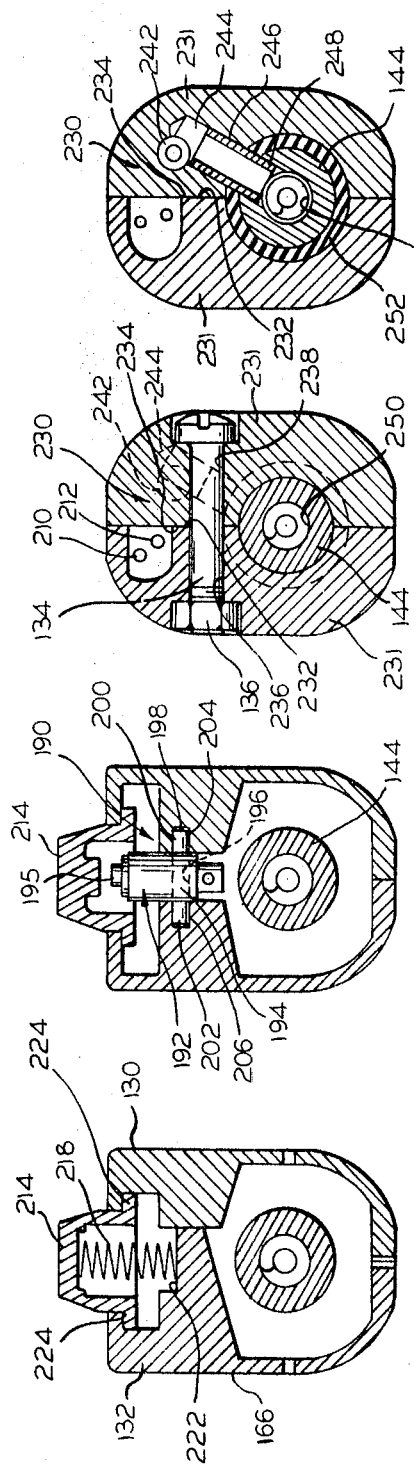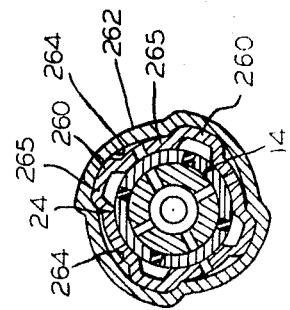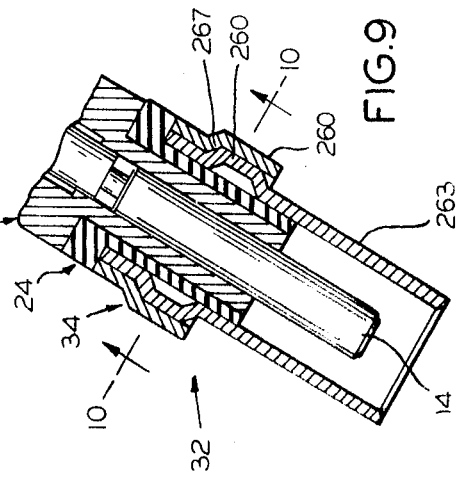

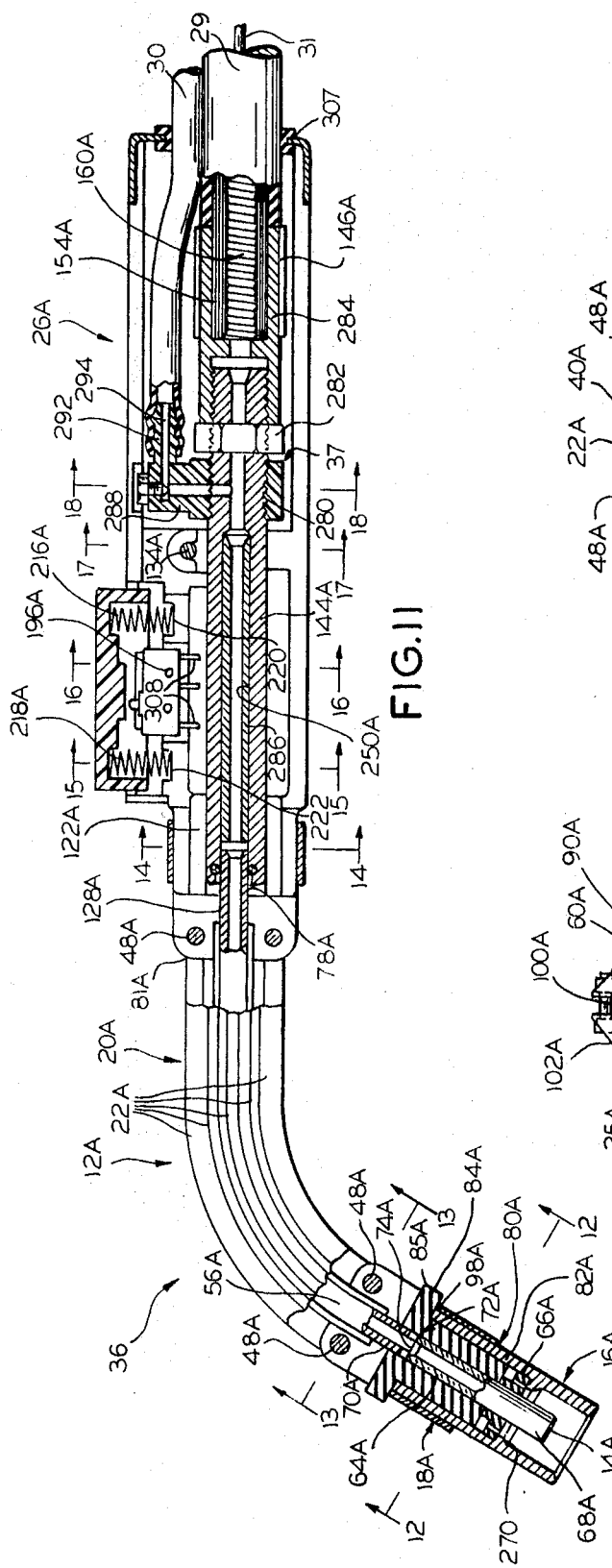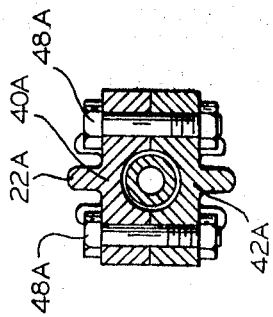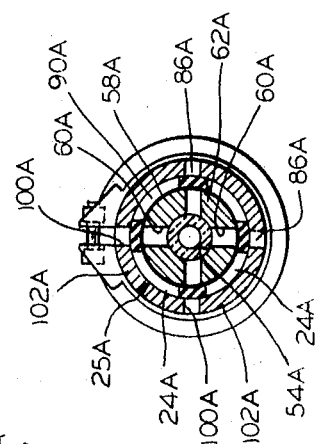

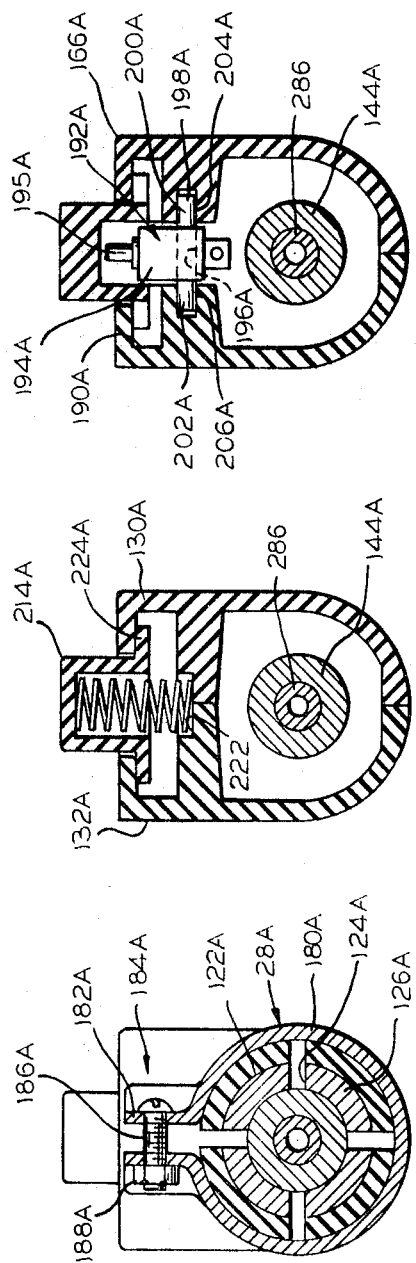

3,596,049

AIR-COOLED WELDING GUN

This invention relates to a welding gun for semiautomatic welding, and more particularly to a welding gun arrangement that is especially designed for metallic electrode inert gas welding (known in the art as MIG welding).

Conventional guns for MIG welding provide no satisfactory way of preventing heat buildup in the gun gas cup, with the result that after prolonged use of the spatter which accompanies all MIG welding starts to pit the inside surface of the gas cup which makes it difficult to remove and results in early failure of the gas cup. Test have shown that as long as the gas cup is maintained sufficiently cool, it will last almost indefinitely so long as mechanical damage to it is avoided.

Furthermore, the securement of contact tips and gas cups conventionally is separately accomplished and ordinarily by means of screw threading that is easily damaged.

A principal object of this invention is to provide an MIG welding gun that is arranged for air-cooling of the gas cup.

Another principal object of the invention is to provide an MIG welding gun in which the gas cup and contact tip are clamped in place by the same securing device.

Further objects of the invention are to provide an MIG welding gun in which the nozzle may be readily adjusted to 360° about its handle and/or, if desired, the entire nozzle replaced, to provide a finned air-cooling nozzle shell arrangement for cooling the gas cup through heat transfer therefrom, and to provide a welding gun for MIG welding that is economical of manufacture, convenient in use, and long lived in operation.

In accordance with this invention, there is provided a welding gun for MIG welding in which the gas cup and the contact tip therefor are simultaneously secured in place by a single clamping arrangement, and the nozzle includes radiating fins to which heat from the gas cup is transferred through a heat transfer path that includes means for electrically isolating the gas cup from the contact tip. The nozzle is connected to its handle by a clamp arrangement that permits ready adjustment or replacement of the nozzle in relation to its handle. The nozzle and handle of the gun are of sectionalized construction for facilitating manufacturing and assembly of same.

Other objects, uses, and advantages will be obvious or become apparent from a consideration of the following detailed description and the application drawings in which like reference numerals are used to designate like parts throughout the several views.

In the drawings:

FIG. 1 is a diagrammatic plan view of one embodiment of the invention, with parts being broken away and shown in section to expose other parts;

FIG. 1A is a diagrammatic perspective view of an electrically insulating gas seal that is employed at the welding end of the gun;

FIG. 1B is a diagrammatic perspective view of the contact-tip-receiving portion of the nozzle which receives the gas seal of FIG. 1A;

FIGS. 2—8 are diagrammatic sectional views taken substantially along the corresponding section lines indicated in FIG. 1;

FIG. 9 is a fragmental view of a modified form of welding gun nozzle arranged in accordance with this invention;

FIG. 10 is a sectional view taken substantially along line 10—10 of FIG. 9;

FIG. 11 is a view similar to that of FIG. 1 illustrating a modified form of the invention;

FIGS. 12—18 are diagrammatic sectional views along the correspondingly numbered section lines of FIG. 1; and FIG. 19 is an enlarged view of the arc forming end of the nozzle shown in FIG. 11.

However, it is to be distinctly understood that the drawing illustrations provided are supplied primarily to comply with the requirements of the Patent Code, and that the invention may have other specific embodiments that will be obvious to those skilled in the art.

GENERAL DESCRIPTION

Reference numeral 10 of FIG. 1 generally indicates one welding gun arranged in accordance with this invention, which comprises a nozzle assembly 12 that includes contact tip 14 and gas cup 16 that are secured to the nozzle assembly 12 by clamp device 18. The nozzle assembly 12 further comprises a nozzle structure 20 that is finned as at 22 for good heat-dissipating characteristics, and which is in good heat-conducting relation to the contact tip; nozzle structure 20 is also in good heat-conducting relation to gas cup 16 through spaced heat transfer segments 24 that are interposed between the nozzle structure 20 and the contact tip.

The nozzle assembly 12 is secured to handle assembly 26 by clamp device 28. The handle assembly 26 is connected to the usual cable 29 and conduit 30 for supplying the electrical energy, the welding wire 31, and the usual neutral gas to the gun.

In accordance with this invention, the clamp device 18 serves to clamp both the contact tip 14 and the gas cup 16 to the nozzle assembly and without requiring any screw-threaded connection between these parts and the nozzle assembly. The gas cup fits directly over and engages segments 24, which are made of good heat transfer materials and are bonded to the nozzle structure 20 by a suitable electrically insulating adhesive having good heat transfer characteristics for conducting heat from the gas cup 16 to the nozzle structure 20 for dissipation of the heat from fins 22. Contact tip is held by nozzle structure 20 and is cooled by heat passing from same to fins 22.

The clamp device 28 permits the operator to readily position the nozzle assembly 12 at any desired position relative to the handle assembly 26, 360° about the axis of the latter, or permits ready removal and replacement of the nozzle assembly as a unit, at the option of the operator.

Other improvements and advantages in the specific arrangement illustrated in FIGS. 1—8 will become apparent as the description proceeds.

In the embodiment 32 of FIGS. 9 and 10, the contact tip 14 and the gas cup 16A are secured to the nozzle assembly by a modified clamp device 34, the specifics of which are best shown in FIG. 10. This embodiment is otherwise the same as that of FIGS. 1—8.

In the embodiment 36 of FIGS. 11—16, the various parts appear in modified form and the handle assembly includes a special gas manifold 37 that insures a leak-free connection between conduit 30 and the gun.

SPECIFIC DESCRIPTION

Referring now specifically to the embodiment of FIGS. 1—8, the nozzle structure 20 generally comprises a pair of shell members 40 and 42 that are of appropriate die-cast aluminum construction and shaped to the configuration indicated in FIGS. 1—4. Sections 40 and 42 are formed to define spaced pairs of opposing flat abutment surfaces 44 and 46, respectively, that in assembled relation of the nozzle structure 40 abut, with the sections 40 and 42 being secured together by appropriate screws 48. Between the surfaces 44 and 46 of the respective sections 40, the respective sections 40 and 42 define the respective concavely rounded recesses 50 and 52 which, when the sections 40 and 42 are placed together, define a bore 54 that receives guide tube 56 that is formed from hardened steel or the like and defines a bore 57 through which the welding wire and shielding gas pass.

The nozzle structure 20 at its tip end 58 is of reduced section and is formed to define a plurality of slots 60 which form the nozzle structure end 58 into a plurality of spaced fingers 62, with the fingers 62 being in concentric relation about the nozzle structure bore 54 and being proportioned to closely receive the inner end 64 of the contact tip 14, the latter being free of screw threading as indicated in FIG. 1.

The contact tip 14, aside from the lack of screw threading, may be conventional in nature and in the form of FIG. 1 has fixed thereto a suitable gas diffuser disc 66, and its end 68 serves as the outlet for the welding wire 31.

The guide tube 56 at its end 70 is excised as at 72 (see FIG. 2) to provide a tubular stud portion 74 at the end 70 of the guide tube against which the contact tip is pushed on being inserted into the nozzle assembly. The excising 72 is inwardly of tube 56 sufficiently to expose bore 57, which serves to provide for passage of the shielding gas (that is supplied to the guide tube in the manner later described) to the slots 60 of the nozzle structure, which provide communication to the gas pooling chamber 75 that is formed by the gas-diffusing disc 66, the terminous 76 of the nozzle structure, the gas cup 16 and the contact tip 14.

As indicated in FIG. 1, the end 78 of the guide tube 56 projects from the end 81 of the nozzle structure for insertion into the handle assembly 26.

The nozzle tip end 58 has associated therewith a gas seal comprising an annular cage 80 (see FIG. 1A) formed from a suitable resiliently compressible material that has good resistance to heat and some heat-conductive capacity, such as silicone rubber, or a suitable plastic substance of equivalent characteristics, and defines annular end portions 82 and 84 connected together by links 86. End portions 82 and 84 and links 86 thus define about the circumference of the seal 80 a plurality of arcuate openings 88 in which the individual spacing segments 24 are disposed. Segments 24 are formed from a suitable material of good heat transfer characteristics such as aluminum or copper.

As already indicated, segments 24 are cemented to the tip end 58 of the nozzle structure 20 with a suitable electrically insulating adhesive 92, such as scotch weld 2214 Hi-Temp adhesive made by 3M Co. If desired, the surfaces 90 of nozzle segments 62 may be precoated with a suitable electrically insulating substance of the qualities indicated, such as the adhesive just suggested. The seal is received over and about the segments 24 with the links 86 being proportioned to fit tightly between segments 24 and sealingly overlie nozzle slots 60 to seal the shielding gas in and the ambient air out. The end portion 84 of the sleeve defines a flange portion 85 which seats against a flange portion 94 that is defined by the nozzle structure 20, and which serves as a stop for the gas cup 16 when positioning same on the nozzle tip end 58.

The gas cup 16 is formed from any suitable material such as aluminum, copper or brass, and its end 96 that extends beyond the contact tip has a conventional configuration; the other end 98 thereof is slotted as at 100 (see FIG. 2) to define spaced fingers 102 which are received over the segments 24 and seal 80, with the end 98 of the gas cup abutting against the flange portion 85 of the seal 80 in the normal application of same.

The fingers 62 defined by the nozzle structure 20 have a length substantially equivalent to the length of the seal 80 including its flange portion 85, while the fingers 102 of gas cup 16 are proportioned so that they do not expose pooling chamber 75 when the cup is in its operative position (see FIG. 1). The end 98 of the gas cup is proportioned to, when clamp device 18 is released, substantially complement and closely fit over the combined annular layer 25 that is formed by the segments 24 and components 82 and 88 of seal 80. Likewise, the nozzle structure fingers 62 are proportioned to substantially complement and closely fit over the contact tip external surface 103, when the clamp device 18 is in its released condition. The internal surfaces 105 of fingers 62 are preferably copper or silver plated to avoid layers of aluminum oxide (which has electrical insulating qualities) from building up at this point.

The clamp device 18 in practice may be of any suitable type, but in the form shown comprises a metallic C-shaped member 110 defining upstanding end portions 112 (see FIG. 2) which are drawn towards each other by a suitable screw-and-nut-type device 114 of any suitable character, which in the form shown comprises a bolt 116 suitably cooperating with nut 118. When the contact tip 14 and the gas cup 16 have been applied to the nozzle structure 20 in the manner indicated in FIG. 1, as by slipping them into place to the respective positions indicated, tightening of the clamp device 18 contracts and compresses the end 98 of the gas cup against the segments 24, which in turn are deflected inwardly against the slotted end portion of the nozzle structure 20 that is in turn contracted against the contact tip to hold it in place. Bars 88 of the sleeve 24 that are disposed between segments 24 compress to permit segments 24 to have the radially inward movement that is required for the contact tip to be gripped by fingers 62. Removal and changing of the contact tip and gas cup is readily effected by loosening the clamp device 18 so that the contact tip and gas cup may be appropriately gripped and withdrawn from the gun to be replaced by suitable replacements of suitable configuration, after which the clamp device 18 may be again tightened to secure the replacements in place.

The segments 24 and seal 80 form an annularly contractable heat transfer and gas-sealing device 25 that is interposed between the nozzle and gas cup fingers.

The nozzle structure 20 at its end 81 is formed to define a flange portion 120 from which projects in the direction of handle assembly 26 a sleeve portion 122 which is slotted as at 124 (see FIG. 4) to define fingers 126 that are received within the handle assembly 26 underneath the clamp device 28.

It will be appreciated, of course, that the nozzle sections 40 and 42 may be arranged in any suitable manner to provide in their assembled relation the bore 54 and end portions 58 and 80 of the nozzle assembly that have been described. A suitable sealing cement is preferably applied between the sections 40 and 42 and the guide tube where indicated at 127 and 128 in FIG. 1, and the exterior surfaces of sections 40 and 42 are coated with a thin coating of a suitable electrically insulating substance that is resistant to mechanical displacement and does not impede heat transfer from the nozzle, such as a suitable epoxy resin.

The handle assembly 26 generally comprises a pair of housing sections 130 and 132, secured together by bolt 134 (see FIG. 7) cooperating with nut 136, annular end cap 138 at the housing end 140, and the clamp device 28 at the handle end 142. Sections 130 and 132 may be formed from a suitable plastic of adequate electrically insulating qualities such as the high-impact Fiberglas-reinforced phenolic resin molding compound made and sold by Fiberite Corporation and identified as FS-5064.

Received between the end assembly sections 130 and 132 is adapter tube 144 which at its end 146 has suitably affixed thereto the cable 29, and at its end 148 is received over the projecting end portion of the guide tube 56, with a suitable gas seal 150 being applied between the adapter tube end 148 and the nozzle structure 20. Fingers 126 of the nozzle structure grip the adapter 144 when clamp 28 is operative, and their internal surfaces 149 are preferably copper or silver coated for the same reason as fingers 62.

Cable 29, as is conventional, comprises a wire helix 152 through which the welding wire 31 moves, which has applied about it copper wiring 154 that carries the welding current and is covered by suitable insulating material 156. As is conventional, the welding wire 31 is supplied from a reel containing a source of supply of same, while the wiring 154 is suitably connected to the welding machine.

In applying the cable 29 to the adapter tube 144 in the form of FIG. 1, the end 27 of the cable is formed as indicated in FIG. 1 so that the end portion 160 of the helix 152 will be disposed closely adjacent to the end 78 of the guide tube 56 and the copper wiring 154 will be adequately received within the contact tube. The cable 29 may be held in assembled relation to the adapter tube in any conventional manner, as by swedging the adapter tube end against the exposed wiring 154. The electrical circuit involved between cable 29 and the contact tip 14 is from the cable through tube 144 and the nozzle sections 40 and 42 to the contact tip where the welding wire 31 picks up the current in the usual manner.

The handle sections 130 and 132 define a housing 166, which at its end 140 is recessed about its outer periphery, as at 168, to frictionally receive the end cap 138 on same. End cap 138 defines opening 170 through which the cable 29 and conduit 30 pass into the handle assembly.

The housing 166 at the end 142 of handle assembly 26 is formed to define a sleeve portion 172 that is slotted as at 174 to define fingers 178 between which the end portion 148 of the adapter tube 140 is received together with the seal 150.

The clamp device 28 may be of any suitable type and for purposes of illustration is is shown to be similar to the clamp device 18 and thus comprises a C-shaped member 180 formed to define upstanding end portions 182 that are drawn together by the suitable bolt and nut type device 184 shown as comprising bolt 186 suitably cooperating with nut 188.

It will thus be seen that when the clamping device 28 is actuated to secure the nozzle assembly to the handle assembly, the fingers 178 of the housing 168 are contracted against the fingers 126 of the nozzle assembly which are in turn contracted against the adapter tube 144, whereby the nozzle assembly and the handle assembly are releasably secured to each other. The fingers 126 and 178 are received in intercalated or overlapping relation over the adapter tube end portion 148, as indicated by FIGS. 1 and 4.

It will thus be seen that the nozzle assembly can readily be adjusted relative to the handle assembly through an arc of 360° at the option of the operator merely by loosening the clamp device 28 and manually positioning the nozzle assembly as desired relative to the handle assembly, after which the clamp device 28 is retightened. Similarly, the entire nozzle assembly 12, if and when found defective, can readily be replaced by loosening the clamp device, removing the defective nozzle assembly, applying the replacement nozzle assembly to the position indicated in FIG. 1, and retightening the clamp device 28.

The housing 166 defined by the handle assembly section 130 and 132 is shaped to define a switch chamber 190 in which is received a suitable off-on switch 192 that comprises the usual housing 194 and pushbutton 195.

In accordance with this invention, the switch housing 194 is formed with a pair of laterally extending openings 196 that each receive a mounting pin 198, which pins have their respective end portions 200 and 202 respectively received in mounting recesses 204 and 206 of the housing 166.

The switch 192 contains the usual electrical contacts that are adapted to be closed by deflection of pushbutton 195, with the switch 192 being connected by suitable leads 210 to the welding machine for purposes of actuating same in the usual manner. Leads 210 and 212 proceed through suitable recesses in the housing 166 and outwardly of the end cap 138 opening 170 to the welding machine.

In the specific arrangement illustrated, the switch chamber 190 is closed by thumb actuated trigger 214 that is biased outwardly of the switch chamber 190 by suitable compression springs 216 and 218 that cooperate between same and the respective spring seats 220 and 222 that are defined by the housing 166. Trigger 214 is flanged as at 224 (see FIG. 5) for suitable engagement with the housing 166 such that member 214 will be spaced from button 195 in the release position of the device (and the "off" position of the gun).

The sections 130 and 132 of the handle that form housing 166 are formed as at 230 to define solid portions 231 that form abutting surfaces 232 and 234 about the respective openings 236 and 238 through which the securing bolt 134 is received. The sections 130 and 132 are also formed to engage the adapter tube 144 at the same area of the handle, and as indicated in the sectional views of FIGS. 5—8, the sections 130 and 132 abut each other about the top and bottom of the handle assembly except in the area of the trigger 214.

As indicated in FIG. 1, the gas conduit 30 (that leads from the gas source) is secured as at 240 to tubular element 242 (that is mounted in bore 243 formed in the handle section 130) that extends between the conduit 30 and a bore 244 of handle section 130 in which is received a tubular element 246 that is mounted in the adapter tube 144 as at 248 and communicates between the bore 244 and the bore 250 of the adapter tube. A suitable annular seal 252 received within recess 254 of the housing 166 is applied in sealing relation about the adapter tube 144 and tubular element 246 to provide a suitable gas seal about the tubular element 246 and between same and the housing sections 130 and 132. Gas supplied under pressure to the conduit 30 thus passes through the tubular element 242, bore 244, tubular element 246 and into the bore 250 of the adapter tube where it passes between the coils of helix 156 and flows in the tolerance spacing between the helix and the welding wire 31 to and into the guide tube 56 and thence to the excised end 70 thereof for communication to the slots 60 of a nozzle structure.

The solid portion 231 of handle section 132 is grooved as at 252 (see FIGS. 7 and 8) to accommodate leads 210 and 212 of switch 192.

The sections 130 and 132 defining the housing 166 of handle assembly 26 may be formed in any suitable manner to provide the structural features indicated when assembled in the manner indicated.

In the embodiment 32 of FIGS. 9 and 10, the nozzle structure 20, the contact tip 14, the segments 24, and seal 80 are the same as in the gun 10. In this embodiment of the invention, the end 261 of the gas cup 263 has its fingers 265 indented outwardly as at 260 for cooperation with a special camming sleeve element 262 shaped to define internal camming surfaces 264 that cooperate with the respective indentations 260 to deflect the fingers 265 of the gas cup 263 into clamping relation with the heat conducting segments 24 in the manner similar to that described in connection with the embodiment of FIG. 1.

Thus, the operator by rotating sleeve member 262 in a counterclockwise direction (see FIG. 10) will cam the respective indentations 260 inwardly to provide the clamping action that is desired, while movement in the opposite direction will release the gas cup fingers 265 for ready removal thereof, as well as the contact tip 14, from the gun 32.

The external configuration of the sleeve 262 makes for ready gripping and turning by the operator.

In the embodiment 36 of FIGS. 11—18, the nozzle assembly 12A and the handle assembly 26A are fundamentally similar to the corresponding components of the gun 10.

In the case of nozzle assembly 12A, the shell members 40A and 42A of the nozzle structure 20A are secured together at the ends thereof by spaced pairs of bolts 48A, and the gas diffusing the disc 66A is seated between a flange 270 of the gas cup 16A and the end 76 of nozzle fingers 62 (disc 66A being slidably received on tip 14A). Otherwise the nozzle assembly 12A is essentially the same as nozzle assembly 12 (as indicated by similar reference numerals using the suffix "A.").

In the case of the handle assembly 26A, the housing sections 130A and 132A are proportioned to receive gas manifold 37 that takes the place of passage 244 and seal 252 of gun 10, and is received on a simplified adapter tube 144A that is threaded as at 280 to threadedly receive the manifold 37 as well as lock nut 282 and adapter fitting 284, the latter being turned up against nut 282 for locking purposes and forming the end 146A of the adapter tube 144A. The bore 250A of adapter tube 144A is shaped to receive a hardened liner 286 for a substantial portion of its length between the manifold 37 and its end 148A.

Manifold 37 comprises a one piece body 288 formed from nylon or the like, as by a suitable injection molding arrangement, including an internally threaded bore 290 (FIG. 18) that receives adapter tube 144A, a conduit portion 292 over which the end of conduit 30 is applied and defining a passage 294 that leads to passage 296 which in turn is aligned with port 298 of adapter tube 144A in the mounted position of manifold 37. Body 288 also includes a pair of oppositely disposed studs 300 that fit into recesses 302 of the respective housing sections 130A and 132A to prevent shifting movement of the manifold. In the form shown, the passage 296 of manifold 288 is closed by screw 304 which seats in socket 306 that is defined by sections 130A and 132A as a further movement restraining means. A suitable cement is preferably on threading 208 to bond the manifold 37 to tube 144A.

Housing sections 130A and 132B are otherwise formed in a manner equivalent to sections 130 and 132 to accommodate securing bolt 134A, adapter tube 144A, switch 192A, clamp device 28A, end cap 138A (which has a suitable insulating holder 307 applied thereabout), and switch leads 210A (that suitably connect up to switch elements 308). Adapter tube 144A in gun 36 carries O-ring seal 150A that engages guide tube 56A to provide a gas seat thereabout.

Gun 36 thus provides the advantages of gun 10 plus a unique manifold arrangement that simplifies the leak-free application of shielding gas to the gun.

It will therefore be seen that I have provided in an MIG welding gun arrangement a nozzle structure which not only insures adequate cooling of the gas cup and contact tip as well as the necessary electrical insulation of the gas cup from the welding current, but also provides a single clamping arrangement for securing both the welding cup and the contact tip to the nozzle without requiring screw threading of either element or the nozzle.

The heat transfer path from the gas cup is through the relatively wide and long heat transfer area defined by the undersurfaces of heat transfer segments and their electrically insulating bond to the nozzle fingers, from which the heat passes directly to nozzle fins.

Furthermore, a clamping device joins the nozzle structure to the handle structure that is similar to that securing in place the gas cup and contact tip and permits ready adjustment and/or replacement of the nozzle at the option of the operator. The same arrangement permits the operator to dispose the trigger switch at any position he desires relative to the nozzle.

Both the nozzle structure itself and the handle-forming housing are made in two parts that are readily separated for any maintenance that may be necessary. The two section construction of the nozzle structure adapts it for economical die casting production procedures while the two section construction of the housing defined by the handle assembly adapts this structure for economical injection molding production procedures or the like. In combination, the overall assemblage is of very light and easily maneuverable construction yet well suited for long lived operation under the usually encountered severe welding conditions. While the nozzle sections may be formed from any suitable electrically and thermally conductive material, aluminum is preferred because of its adequate strength, lightweight and economical costs.

The foregoing description and the drawings are given merely to explain and illustrate my invention and the invention is not limited thereto, except insofar as the appended claims are so limited, since those skilled in the art who have my disclosure before them will be able to make modifications and variations therein without departing from the scope of the invention.

I claim:

1. A welding gun for consumable electrode welding, comprising:
   a nozzle structure,
   a handle structure for the nozzle structure
   said handle structure comprising:
   an adapter tube having one end thereof shaped to communicate with the said nozzle structure,
   said adapter tube including means for connecting same to a source of electrical energy and means for guiding the welding wire through same into said nozzle structure,
   and a shell structure overlying said adapter tube including a hand gripping portion for gripping by the operator,
   and means for releasably securing said handle structure to said nozzle structure,
   said securing means comprising:
   portions of said nozzle structure and said handle structure being slotted longitudinally thereof and arranged in substantial concentric overlapping relation over said adapter tube,
   and means for releasably but fixedly clamping said nozzle and handle structure portions to said adapter tube to secure said structures together against relative movement therebetween,
   whereby the position of said nozzle structure relative to said handle structure is normally fixed but on release of said clamping means may be adjusted to any position 360° about said adapter tube.

2. A welding gun for consumable electrode welding, said gun comprising:
   a nozzle structure,
   a handle structure for the nozzle structure,
   said handle structure comprising:
   an adapter tube having one end thereof shaped to communicate with the said nozzle structure,
   said adapter tube including means for connecting same to a source of electrical energy and means for guiding the welding wire through same into said nozzle structure,
   a shell structure overlying said adapter tube including a hand gripping portion for gripping by the operator,
   means for releasably securing said handle structure to said nozzle structure,
   said securing means comprising:
   portions of said nozzle structure and said handle structure being slotted longitudinally thereof and arranged in substantial concentric overlapping relation over said adapter tube,
   and means for releasably but fixedly clamping said nozzle and handle structure portions to said adapter tube to secure said structures together against relative movement therebetween,
   whereby the position of said nozzle structure relative to said handle structure is normally fixed but on release of said clamping means may be adjusted to any position 360° about said adapter tube,
   said handle structure shell structure being sectionalized longitudinally thereof,
   and means for releasably securing said handle structure sections together over said adapter tube,
   and means for connecting said adapter tube to a source of arc shielding gas under pressure.

3. The welding gun set forth in claim 2 wherein said means for connecting said adapter tube to the source of shielding gas comprises:
   a pair of communicating bores formed in one of the housing sections,
   means for connecting one of said bores to the source of shielding gas,
   means for connecting the other of said bores to said adapter tube,
   and means for sealing the connection between said other bore and said adapter tube.

4. The welding gun set forth in claim 2 wherein said means for connecting said adapter tube to the source of shielding gas comprises:
   a manifold device secured to said adapter tube in sealing relation thereto,
   said manifold device comprises a body formed with conduit means providing connections for securing same between the shielding gas source and the bore of said adapter tube,
   said housing structure sections and said manifold body being formed for interfitting relation to restrain said manifold body against displacement relative to said adapter tube.

5. The welding gun set forth in claim 1 wherein:
   said handle structure shell structure is sectionalized longitudinally thereof,
   and including means for releasably securing said handle structure shell structure sections together over said adapter tube,
   said clamping means being adjacent one end of said handle structure,
   said releasable securing means comprising
   a cap removably received over said shell structure sections at the other end of said handle structure, screw means interconnecting said sections intermediate said ends of said handle structure,
and said clamping means.

6. The welding gun set forth in claim 5 wherein:

said shell structure sections define a sectionalized trigger switch chamber that is completed when said sections are secured together, and including:

a trigger switch positioned in said chamber, and mounting pin means extending between said housing sections and said switch for mounting said switch in said chamber.

7. The welding gun set forth in claim 6 including:

a trigger for actuating said switch, said trigger comprising:

a trigger member positioned in overlying relation to said switch within an opening defined by said shell structure sections on one side of said handle structure, and means for spring biasing said trigger member outwardly of said shell structure for engagement by the thumb of the operator for actuating said switch by depressing said trigger member, said trigger member including flange means received within and under said shell structure to retain said trigger member within said shell structure.

8. The welding gun set forth in claim 2 wherein said means for connecting said adapter tube to a source of shielding gas comprises:

a manifold device mounted on said adapter tube and comprising a one piece body fixed to said adapter tube and providing connections for securing same between the shielding gas source and the bore of said adapter tube.